United States Patent [19]

Seog Tae

[11] Patent Number: 5,146,059
[45] Date of Patent: Sep. 8, 1992

[54] MICROWAVE LEAKAGE SHIELDING DEVICE FOR A MICROWAVE OVEN DOOR

[75] Inventor: Kim Seog Tae, Kyongsangnam-Do, Rep. of Korea

[73] Assignee: Goldstar Co., Ltd., Seoul, Rep. of Korea

[21] Appl. No.: 616,090

[22] Filed: Nov. 20, 1990

[30] Foreign Application Priority Data

Dec. 15, 1989 [KR] Rep. of Korea ............. 89-19025[U]

[51] Int. Cl.$^5$ .............................................. H05B 6/76
[52] U.S. Cl. ....................... 219/10.55 D; 174/35 MS
[58] Field of Search ................ 219/10.55 D, 10.55 C; 174/35 R, 35 MS

[56] References Cited

U.S. PATENT DOCUMENTS

| | | | |
|---|---|---|---|
| 2,920,174 | 1/1960 | Haagensen | 219/10.55 F |
| 4,008,383 | 2/1977 | Tanaka et al. | 219/10.55 D |
| 4,206,338 | 6/1980 | Katona | 219/10.55 D |
| 4,211,910 | 7/1980 | Kusunoki et al. | 219/10.55 D |
| 4,695,694 | 9/1987 | Hill et al. | 219/10.55 D |
| 4,700,034 | 10/1987 | Lee | 219/10.55 D |
| 4,745,247 | 5/1988 | Fukumoto | 219/10.55 D |
| 4,822,968 | 4/1989 | Chin | 219/10.55 D |

FOREIGN PATENT DOCUMENTS 1180232 2/1970 United Kingdom ........ 219/10.55 D

Primary Examiner—Philip H. Leung
Attorney, Agent, or Firm—Birch, Stewart, Kolasch & Birch

[57] ABSTRACT

A microwave oven door comprising an aluminum layer disposed at a front glass and a rear glass of the microwave oven door, respectively, and a plurality of large size holes of a seal plate, whereby the user can easily check the cooking condition of food to be cooked in the microwave oven and an radiant heat can be prevented from leaking through the microwave oven door.

4 Claims, 2 Drawing Sheets

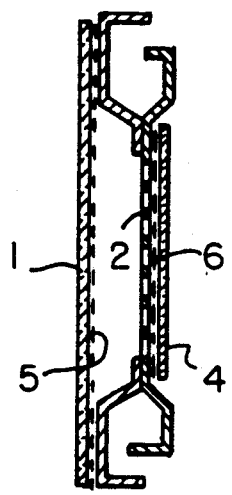
FIG. 3
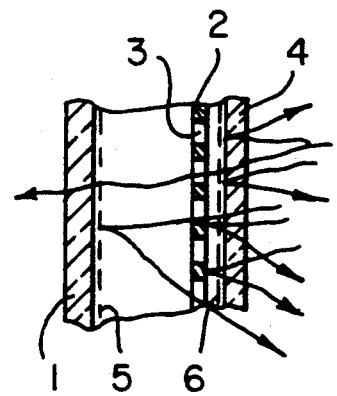
FIG. 4
FIG. 5
PRIOR ART
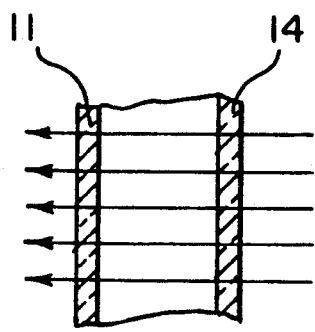
FIG. 6
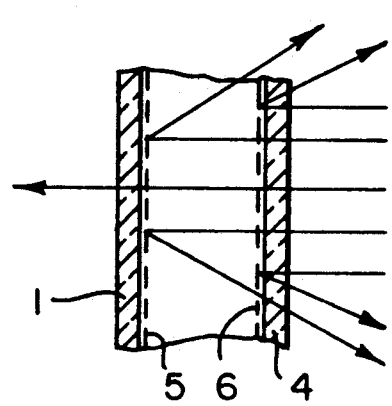

MICROWAVE LEAKAGE SHIELDING DEVICE FOR A MICROWAVE OVEN DOOR

BACKGROUND OF THE INVENTION

1. Field of the Invention

The present invention relates to an improved microwave shielding device for a microwave oven door for preventing from leaking the microwave energy and radiant heat through the microwave oven door by sealing an aluminum layer disposed at a front glass and a rear glass, respectively.

2. Description of the Prior Art

Generally, a conventional microwave oven door, as shown in FIGS. 1, 2, and 5, includes a frame 15, a transparent front glass 11 disposed in the front of the frame, a seal plate 12 for preventing from leaking the microwave and radiant heat through the microwave oven door, and a transparent rear glass 14 disposed on one side wall of a heating room of the microwave oven.

In such conventional microwave oven door, the front and rear glasses 15 and 14 are used so as to look at food in the heating room for checking the cooking condition of the food and a plurality of holes are formed at the seal plate 12 so as to look at the inside of the heating room. The diameter of the holes is usually below 3 mm and also, the holes occupy about 40% of the seal plate 12.

Thus, in the conventional microwave oven door, the holes have too small to check the cooking or heating condition of the food by looking at the inside of the heating room through the holes. Therefore, it is very difficult and inconvenient to check the food in the microwave oven. Furthermore, the user is apt to open the microwave oven door quite often for reducing loss of the energy.

Also, in such conventional microwave oven door, the radiant heat among the radiant heat, convection heat, and conduction heat transmitted to the food to be cooked is emitted out through the rear glass 14, the holes of the seal plate 12, and the front glass 11 so that the efficiency of energy drops and the front glass 11 becomes hot easily.

SUMMARY OF THE INVENTION

Accordingly, it is an object of the present invention to provide an improved microwave shielding device for use in an microwave oven door so as to prevent from leaking microwave energy and radiant heat through the microwave oven door.

Another object of the present invention is to provide a microwave oven door which includes an aluminum seal layer disposed at the inside of a front and rear glasses of the microwave oven door, respectively, for shielding the microwave energy so that it is easy to look at the food in the microwave oven through the seal plate which includes a plurality of holes having a large size.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a microwave oven door comprising an aluminum layer disposed at a front glass and a rear glass of the microwave oven door, respectively, and a plurality of large size holes of a seal plate, whereby the user can easily check the cooking condition of food to be cooked in the microwave oven and an radiant heat can be prevented from leaking through the microwave oven door.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 is a sectional view of the microwave oven door according to the present invention;

FIG. 4 is an enlarged sectional view of the microwave oven door according to the present invention showing that the aluminum layers prevent from leaking the microwave energy and radiant heat;

FIG. 5 is an enlarged sectional view of the conventional microwave oven door showing a radiating condition of the radiant heat; and FIG. 6 is an enlarged sectional view of the microwave oven door according to the present invention showing a radiating condition of the radiant heat.

DESCRIPTION OF THE PREFERRED EMBODIMENTS

Figure 1:
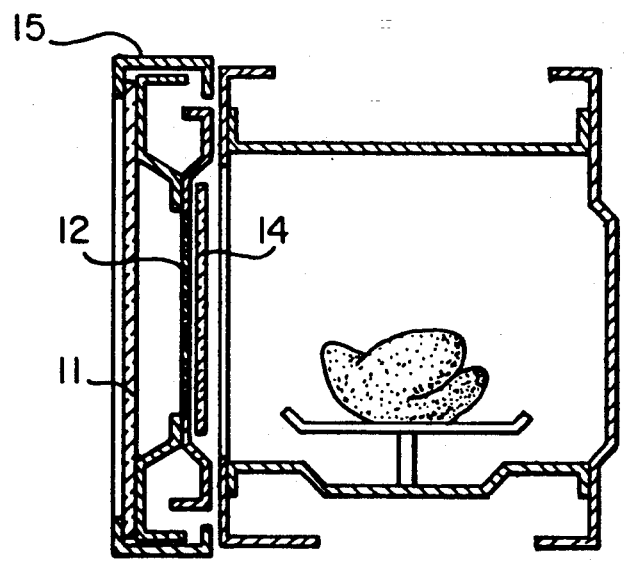
FIG. 1 is a schematic sectional view of a conventional microwave oven.
Figure 2:
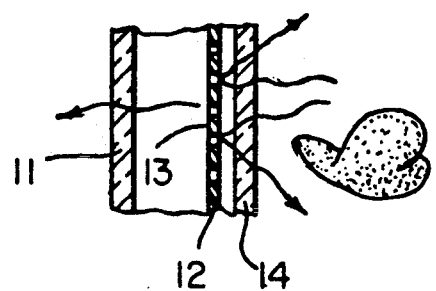
FIG. 2 is an enlarged sectional view of the conventional microwave oven door.

Referring now in detail to the drawings for the purpose of illustrating preferred embodiments of the present invention, the microwave shielding device for a microwave oven door as shown in FIGS. 3, 4, and 6, comprises a front glass 1 attached to the front of a microwave oven door, a seal plate 2, a rear glass 4 attached to the back of the microwave oven door, a front aluminum layer 5 disposed on the back surface of the front glass 1, and a rear aluminum layer 6 disposed on the front surface of the rear glass 4. The seal plate 2 contains a plurality of holes 3 having a diameter of over 3 mm. That is, the holes 3 are bigger than the conventional holes, below 3 mm, of the conventional seal plate 12 of FIG. 1. The front and rear glasses 1 and 4 can be replaced by transparent acryl.

In the microwave oven, microwaves occurred in the heating room of the microwave oven reflect on the metal and transmit plastic or glass, as shown in FIG. 4. Therefore, first of all, microwaves reflect on the rear aluminum layer 6 of the rear glass 4; second, the microwaves reflect on the seal plate 2 if any microwaves transmit the rear aluminum layer 6 of the rear glass 4; and third, the microwaves reflect on the front aluminum layer 5 of the front glass 1 even if the microwaves transmit the holes 3 of the seal plate 2. Therefore, a very small amount of microwaves can be emitted out through the front glass 1. That is, the microwave energy and radiant heat do not leak through the plurality of holes 3 even though the holes 3 have a diameter of over 3 mm.

Accordingly, it is possible to make the size of the holes 3 have larger than that of conventional holes, below 3 mm. Therefore, it is easy for the user to look at the food to be cooked the inside of the heating room through the large holes 3 without opening the microwave oven door.

The radiant heat can reflect on the front and rear aluminum layers 5 and 6 of the front glass 1 and rear glass 4 as shown in FIG. 6 so that it returns to the heating room so that the efficiency of energy can increase and the front glass 1 cannot easily become hot due to the reflection of radiant heat and it is possible to make a total door thin.

As described above, the present invention can prevent from leaking microwave from radiating by a simple system which forms aluminum layers 5 and 6 disposed on the front glass and rear glass and it is possible to make holes of seal plate have large size. Accordingly, the user can easily look at the inside of the heating room without opening microwave oven door and a radiant heat cannot be radiated and the efficiency of energy can increase.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. In a microwave oven door, a microwave leakage shielding device comprising:

a door frame, a front transparent member attached to the front of said door frame, a front aluminum layer attached to the inside surface of said front transparent member, a rear transparent member attached to the back of said door frame, a rear aluminum layer attached to the inside surface of said rear transparent member, and a seal plate adjacent to said rear aluminum layer of rear transparent member, said seal plate having a plurality of large size holes, each of said large size holes having a diameter of over 3 mm, whereby the user can easily look at the food in the microwave oven through the large size holes and microwave energy and radiant heat can be prevented from leaking by early reflecting through the front and rear aluminum layers.

2. In the microwave oven door, the microwave leakage shielding device of claim 1, wherein the front and rear aluminum layers are evaporated at the inside surface of front and rear transparent members.

3. In the microwave oven door, the microwave leakage shielding device of claim 1, wherein the front and rear transparent members are transparent acryl.

4. In the microwave oven door, the microwave leakage shielding device of claim 1, wherein the front and rear transparent members are glass.

* * * * *